(12) United States Patent
Takigawa

(10) Patent No.: US 10,671,334 B2
(45) Date of Patent: Jun. 2, 2020

(54) PRINT SYSTEM, PRINT SERVER, MANAGEMENT SERVER, AND JOB LIST PROVIDING METHOD

(71) Applicant: Minako Takigawa, Tokyo (JP)

(72) Inventor: Minako Takigawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/228,941

(22) Filed: Dec. 21, 2018

(65) Prior Publication Data

US 2019/0250865 A1 Aug. 15, 2019

(30) Foreign Application Priority Data

Feb. 14, 2018 (JP) ................................ 2018-024457

(51) Int. Cl.
*G06F 3/12* (2006.01)

(52) U.S. Cl.
CPC ............ *G06F 3/1267* (2013.01); *G06F 3/121* (2013.01); *G06F 3/1203* (2013.01); *G06F 3/127* (2013.01); *G06F 3/1238* (2013.01); *G06F 3/1262* (2013.01); *G06F 3/1288* (2013.01); *G06F 3/1287* (2013.01)

(58) Field of Classification Search
None
See application file for complete search history.

(56) References Cited

U.S. PATENT DOCUMENTS

| | | | | |
|---|---|---|---|---|
| 6,738,156 B1 * | 5/2004 | Simpson | ............... | G06F 3/1204 358/1.15 |
| 8,154,752 B2 * | 4/2012 | Shaw | .................... | G06F 21/608 358/1.13 |
| 2002/0002602 A1 * | 1/2002 | Vange | ................... | G06F 9/5027 709/219 |
| 2002/0002603 A1 | 1/2002 | Vange | | |

(Continued)

FOREIGN PATENT DOCUMENTS

| | | |
|---|---|---|
| JP | 8-101752 | 4/1996 |
| JP | 08101752 A * | 4/1996 |

(Continued)

OTHER PUBLICATIONS

U.S. Appl. No. 15/992,325, filed May 30, 2018 Minako Takigawa.
Extended European Search Report dated Jul. 12, 2019 in European Patent Application No. 18212928.8, 13 pages.

*Primary Examiner* — Ted W Barnes
(74) *Attorney, Agent, or Firm* — Oblon, McClelland, Maier & Neustadt, L.L.P.

(57) ABSTRACT

A print system includes print servers that each store a print job, a management server that manages the print servers, a printer that performs printing of the print job, a print server information storage area that stores print server information, a shared information storage area that stores information of the print job, and a shared data storage area that stores data of the print job. The print servers each include circuitry that receives a job list request from the printer, acquires the information of the print job in a first group of the each of the print servers from the shared information storage area, (Continued)

acquires the information of the print job in a second group different from the first group from at least one of the print servers in the second group, and provides a job list to the printer.

11 Claims, 11 Drawing Sheets

(56) References Cited

U.S. PATENT DOCUMENTS

| | | | |
|---|---|---|---|
| 2002/0002611 A1 | 1/2002 | Vange | |
| 2002/0002618 A1 | 1/2002 | Vange | |
| 2002/0002622 A1 | 1/2002 | Vange et al. | |
| 2002/0002625 A1 | 1/2002 | Vange et al. | |
| 2002/0002636 A1 | 1/2002 | Vange et al. | |
| 2002/0002686 A1 | 1/2002 | Vange et al. | |
| 2002/0004796 A1 | 1/2002 | Vange et al. | |
| 2002/0004816 A1 | 1/2002 | Vange et al. | |
| 2002/0007404 A1 | 1/2002 | Vange et al. | |
| 2002/0019853 A1 | 2/2002 | Vange et al. | |
| 2002/0023159 A1 | 2/2002 | Vange et al. | |
| 2002/0056006 A1 | 5/2002 | Vange et al. | |
| 2002/0059170 A1 | 5/2002 | Vange | |
| 2002/0154335 A1* | 10/2002 | Matoba | G06F 3/1288 358/1.15 |
| 2003/0079030 A1 | 4/2003 | Cocotis et al. | |
| 2006/0129697 A1 | 6/2006 | Vange et al. | |
| 2006/0294251 A1 | 12/2006 | Cocotis et al. | |
| 2007/0282985 A1* | 12/2007 | Childress | G06F 9/5061 709/223 |
| 2008/0239382 A1* | 10/2008 | Matsueda | G06F 3/121 358/1.15 |
| 2009/0009802 A1* | 1/2009 | Shaw | G06F 21/608 358/1.15 |
| 2010/0157998 A1 | 6/2010 | Vange et al. | |
| 2010/0182640 A1* | 7/2010 | Daigo | G06F 21/33 358/1.15 |
| 2010/0302579 A1* | 12/2010 | Nuggehalli | G06F 3/1203 358/1.15 |
| 2011/0222116 A1* | 9/2011 | Tomita | G06F 3/122 358/1.15 |
| 2011/0238860 A1 | 9/2011 | Vange et al. | |
| 2011/0246665 A1 | 10/2011 | Vange et al. | |
| 2011/0302321 A1 | 12/2011 | Vange et al. | |
| 2012/0054308 A1 | 3/2012 | Vange et al. | |
| 2012/0059907 A1 | 3/2012 | Vange et al. | |
| 2012/0188599 A1 | 7/2012 | Kyono | |
| 2012/0218600 A1 | 8/2012 | Shaw et al. | |
| 2013/0120784 A1* | 5/2013 | Takagi | H04N 1/0023 358/1.14 |
| 2013/0163037 A1* | 6/2013 | Huster | G06F 3/1205 358/1.15 |
| 2014/0022573 A1* | 1/2014 | Schleede | G06F 3/1213 358/1.13 |
| 2014/0074981 A1 | 3/2014 | Vange et al. | |
| 2014/0189170 A1 | 7/2014 | Takigawa | |
| 2015/0019753 A1 | 1/2015 | Vange et al. | |
| 2015/0103370 A1 | 4/2015 | Takigawa | |
| 2015/0116764 A1* | 4/2015 | Mori | G06F 3/1204 358/1.15 |
| 2015/0124282 A1* | 5/2015 | Minagawa | G06F 3/1222 358/1.15 |
| 2015/0293734 A1* | 10/2015 | Shirai | G06F 3/121 358/1.15 |
| 2015/0339549 A1* | 11/2015 | Takasu | G06F 3/1288 358/1.15 |
| 2016/0094471 A1* | 3/2016 | Newton | H04L 67/2842 709/226 |
| 2016/0117135 A1* | 4/2016 | Yoshida | G06F 3/1222 358/1.15 |
| 2016/0165008 A1 | 6/2016 | Vange et al. | |
| 2016/0239246 A9* | 8/2016 | Takano | G06F 3/1205 |
| 2016/0286079 A1* | 9/2016 | Nishimura | H04N 1/36 |
| 2017/0132501 A1* | 5/2017 | Yamakawa | G06K 15/1859 |
| 2017/0195506 A1* | 7/2017 | Kato | H04N 1/00347 |
| 2017/0331919 A1 | 11/2017 | Vange et al. | |
| 2018/0210686 A1 | 7/2018 | Takigawa et al. | |
| 2018/0293084 A1* | 10/2018 | Kadloor | G06F 9/44505 |
| 2018/0332109 A1* | 11/2018 | Branch | H04L 61/2514 |
| 2019/0025903 A1* | 1/2019 | Mehta | G06F 9/5094 |
| 2019/0109924 A1 | 4/2019 | Vange et al. | |

FOREIGN PATENT DOCUMENTS

| | | | | |
|---|---|---|---|---|
| JP | 2001306286 A | * | 11/2001 | |
| JP | 2002-279335 | | 9/2002 | |
| JP | 2002-288161 | | 10/2002 | |
| JP | 2003-167824 | | 6/2003 | |
| JP | 2003-167825 | | 6/2003 | |
| JP | 2003-167852 | | 6/2003 | |
| JP | 2003167852 A | * | 6/2003 | |
| JP | 2003-250117 | | 9/2003 | |
| JP | 2003-250140 | | 9/2003 | |
| JP | 2003-250141 | | 9/2003 | |
| JP | 2003-250142 | | 9/2003 | |
| JP | 2003-305150 | | 10/2003 | |
| JP | 2003-308540 | | 10/2003 | |
| JP | 2003-309799 | | 10/2003 | |
| JP | 2003-309842 | | 10/2003 | |
| JP | 2003-346024 | | 12/2003 | |
| JP | 2004-038580 | | 2/2004 | |
| JP | 2004-220193 | | 8/2004 | |
| JP | 2004-229018 | | 8/2004 | |
| JP | 2004-320366 | | 11/2004 | |
| JP | 2004-363934 | | 12/2004 | |
| JP | 2005-078517 | | 3/2005 | |
| JP | 2005-084739 | | 3/2005 | |
| JP | 2005-209042 | | 8/2005 | |
| JP | 2005-209086 | | 8/2005 | |
| JP | 2006-048575 | | 2/2006 | |
| JP | 2006-053977 | | 2/2006 | |
| JP | 2006-163943 | | 6/2006 | |
| JP | 2006-235734 | | 9/2006 | |
| JP | 2006-260241 | | 9/2006 | |
| JP | 2006-343799 | | 12/2006 | |
| JP | 2008-205747 | | 9/2008 | |
| JP | 2010-098667 | | 4/2010 | |
| JP | 2011170429 A | * | 9/2011 | |
| JP | 2012-064004 | | 3/2012 | |
| JP | 2012064004 A | * | 3/2012 | G06F 3/1288 |
| JP | 2012-150715 | | 8/2012 | |
| JP | 2013-109536 | | 6/2013 | |
| JP | 2013-257825 | | 12/2013 | |
| JP | 2014-127125 | | 7/2014 | |
| JP | 2015-005142 | | 1/2015 | |
| JP | 2015-079325 | | 4/2015 | |
| JP | 2015-212907 | | 11/2015 | |
| JP | 2016-177461 | | 10/2016 | |
| JP | 2017-027512 | | 2/2017 | |
| JP | 2017-107389 | | 6/2017 | |
| JP | 2018-049594 | | 3/2018 | |
| JP | 2018-120334 | | 8/2018 | |
| WO | WO 01/80003 A2 | | 10/2001 | |
| WO | WO 01/80003 A3 | | 10/2001 | |

* cited by examiner

FIG. 12

| PRINT SERVER NAME | ADDRESS | GROUP ID | OWNER ID |
|---|---|---|---|
| DS#1 | 10.10.10.10 | AAAA | user1@domain1 |
| DS#2 | 10.10.11.11 | AAAA | user1@domain1 |
| DS#3 | 10.10.12.12 | BBBB | user1@domain1 |
| DS#3 | 10.10.12.12 | BBBB | user1@domain1 |

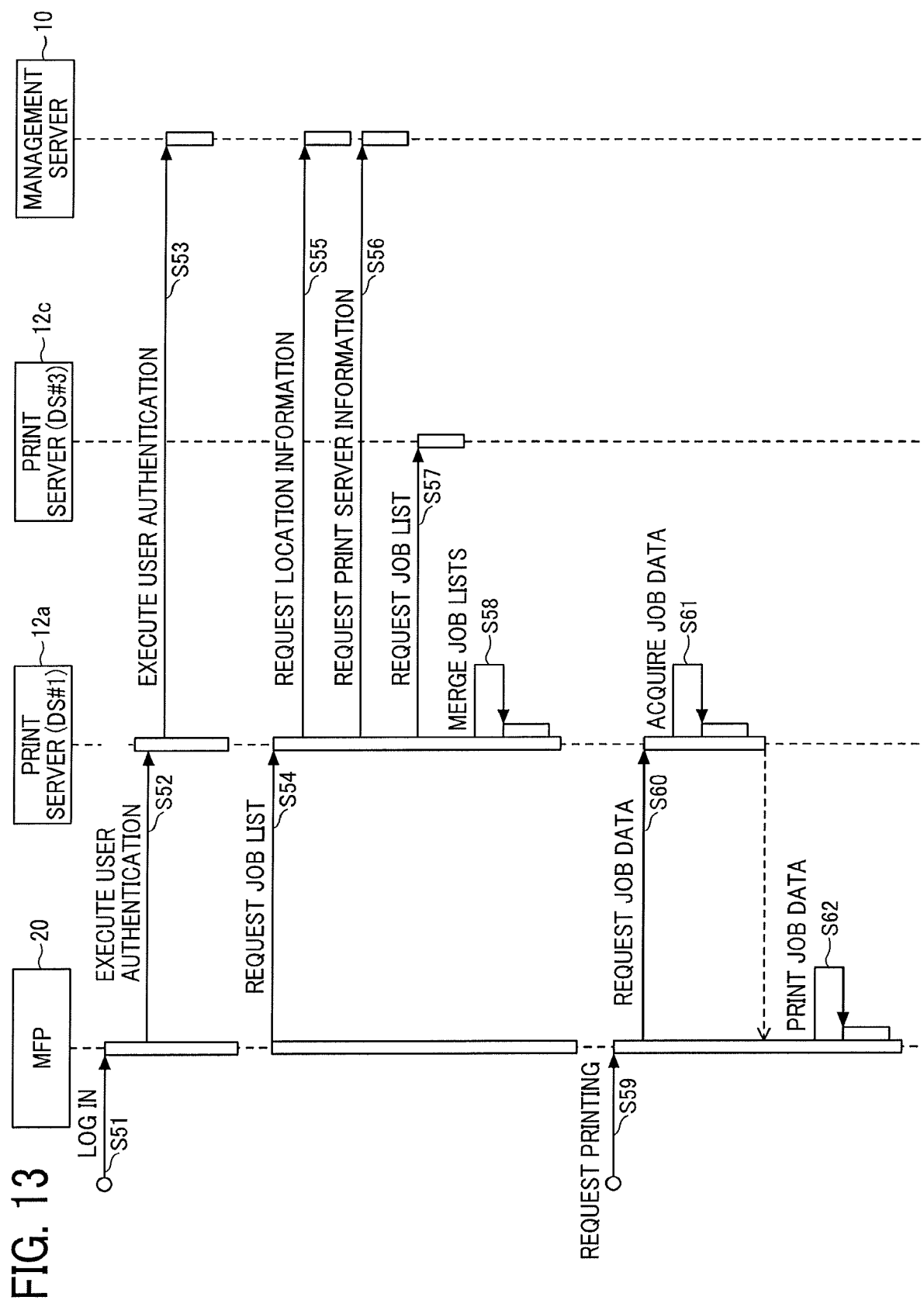

PRINT SYSTEM, PRINT SERVER, MANAGEMENT SERVER, AND JOB LIST PROVIDING METHOD

CROSS-REFERENCE TO RELATED APPLICATIONS

This patent application is based on and claims priority pursuant to 35 U.S.C. § 119(a) to Japanese Patent Application No. 2018-024457, filed on Feb. 14, 2018, in the Japan Patent Office, the entire disclosure of which is hereby incorporated by reference herein.

BACKGROUND

Technical Field

The present invention relates to a print system, a print server, a management server, and a job list providing method.

Description of the Related Art

There is a so-called pull print system in which a print storing device temporarily stores a print job registered by a terminal apparatus, and in response to a print instruction from a logged-in user authenticated by an authenticating device, an image forming apparatus receives the print job from the print storing device and executes printing of the print job.

SUMMARY

In one embodiment of this invention, there is provided an improved print system that includes, for example, a plurality of print servers, a management server, a printer, a print server information storage area, a shared information storage area, and a shared data storage area. Each of the plurality of print servers is capable of storing a print job in response to an instruction from a user to store the print job. The management server manages the plurality of print servers. The printer, in response to a print instruction from the user, acquires the print job from one of the plurality of print servers and perform printing of the print job. The print server information storage area is stores print server information that associates print server identification information of each of the plurality of print servers with group identification information of a group to which each of the plurality of print servers belongs. The shared information storage area is stores information of the print job to be shared by at least one of the plurality of print servers that belongs to a same group. The shared data storage area stores data of the print job to be shared by the at least one of the plurality of print servers in the same group. Each of the plurality of print servers includes a processor receives a request for a print job list from the printer, acquire the information of the print job in a group of the each of the plurality of print servers from the shared information storage area, acquire the information of the print job in another group different from the group of the each of the plurality of print servers from at least one of the plurality of print servers in the another group, and provide the print job list that is acquired to the printer.

In one embodiment of this invention, there is provided an improved print server connectable, via a network, to a management server that manages a plurality of print servers each capable of storing a print job in response to an instruction from a user to store the print job. The print server includes, for example, a processor to: acquire, from a print server information storage area, print server information that associates print server identification information of the print server with group identification information of a group to which the print server belongs; receive a request for a print job list from a printer that, in response to a print instruction from the user, acquires the print job from one of the plurality of print servers and performs printing of the print job; acquire information of the print job in the group of the print server from a shared information storage area that stores information of the print job to be shared by at least one of the plurality of print servers that belongs to a same group; acquire information of the print job in another group different from the group of the print server from at least one of the plurality of print servers in the another group; and provide the print job list that is acquired to the printer.

In one embodiment of this invention, there is provided an improved management server for managing a plurality of print servers each capable of storing a print job in response to an instruction from a user to store the print job. The management server includes, for example, a print server information storage area and a processor. The print server information storage area stores print server information that associates print server identification information of each of the plurality of print servers with group identification information of a group to which each of the plurality of print servers belongs. The processor, in response to a request from one of the plurality of print servers, provides the print server information to the one of the plurality of print servers, and at startup of the one of the plurality of print servers, receive a request for registration of the print server information from the one of the plurality of print servers, and register the print server information in the print server information storage area.

In one embodiment of this invention, there is provided an improved job list providing method performed by a print system connectable, via a network, to a plurality of print servers each capable of storing a print job in response to an instruction from a user to store the print job, a management server for managing the plurality of print servers, and a printer, in response to a print instruction from the user, acquires the print job from one of the plurality of print servers and perform printing of the print job. The job list providing method includes, for example, acquiring, from a print server information storage area, print server information that associates print server identification information of each of the plurality of print servers with group identification information of a group to which each of the plurality of print servers belongs, receiving a request for a print job list from the printer to acquire the print job from one of the plurality of print servers and perform printing of the print job in response to a print instruction from the user, acquiring information of the print job in a group of the one of the plurality of print servers from a shared information storage area that stores information of the print job to be shared by at least one of the plurality of print servers that belongs to a same group, acquiring information of the print job in another group different from the group of the one of the plurality of print servers from at least one of the plurality of print servers in the another group, and providing the print job list that is acquired to the printer based on all of the acquired information.

In one embodiment of this invention, there is provided a non-transitory recording medium storing a control program for controlling a computer to carry out the above-described job list providing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 12 is a diagram illustrating an exemplary configuration of location information stored in the management server; and FIG. 13 is a sequence diagram illustrating an exemplary operation performed in a job printing process.

Figure 1:
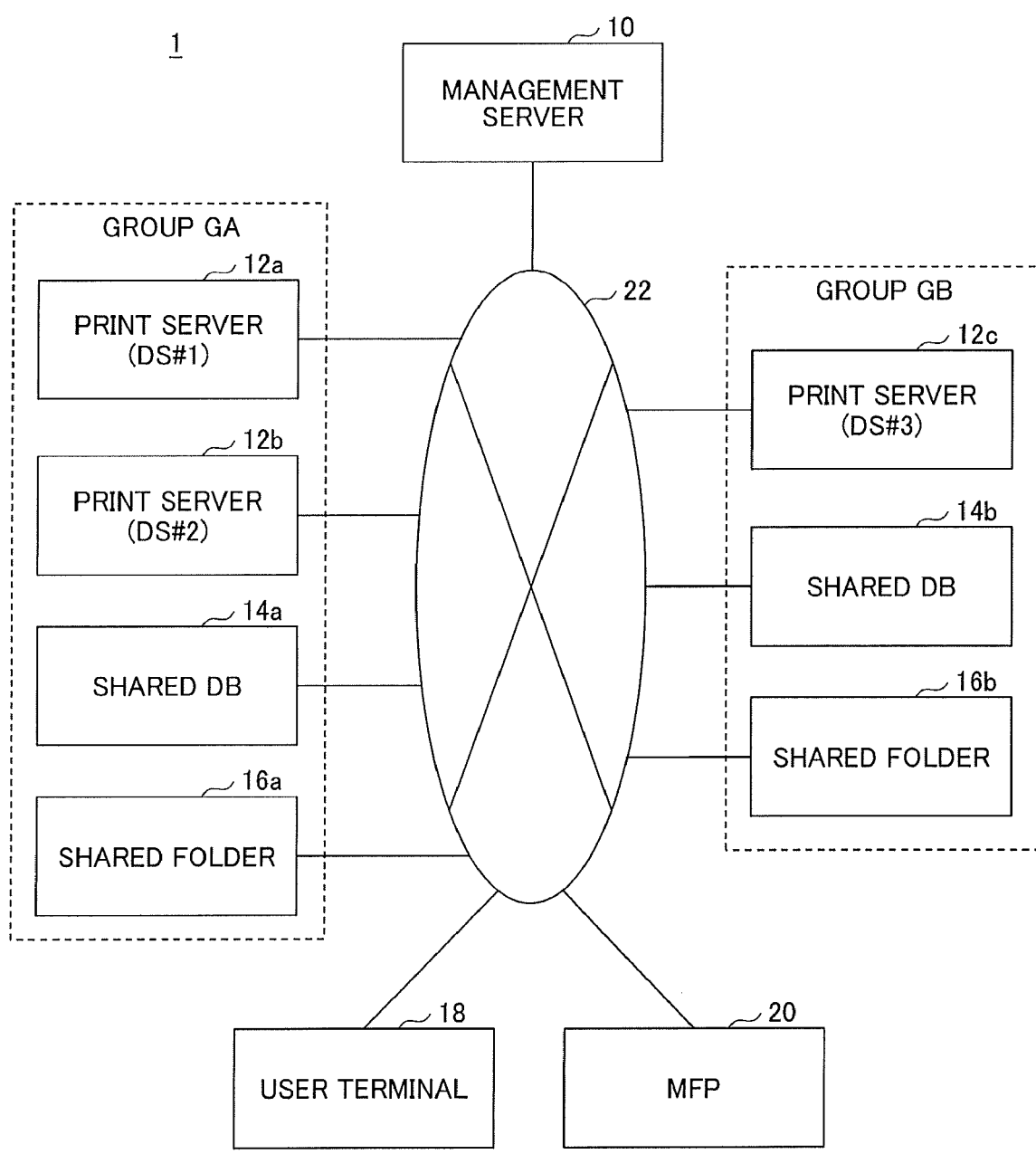
FIG. 1 is a diagram illustrating an exemplary configuration of a print system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

A system configuration of a print system according to the embodiment will first be described.

FIG. 1 is a diagram illustrating an exemplary configuration of a print system according to the embodiment. In a print system 1 in FIG. 1, a management server 10, print servers 12a, 12b, and 12c, shared databases (DBs) 14a and 14b (i.e., a shared information storage area), shared folders 16a and 16b (i.e., a shared data storage area), a user terminal 18, and a multifunction peripheral (MFP) 20 are connected via a network 22 such as the Internet. In the following, the print servers 12a, 12b, and 12c, the shared DBs 14a and 14b, and the shared folders 16a and 16b will be collectively referred to as the print servers 12, the shared DBs 14, and the shared folders 16, respectively, where distinction therebetween is unnecessary.

Each of the print servers 12 stores a pull pint job, and transmits a job list and job data to the MFP 20 in response to a request therefrom. The management server 10 performs system management of the print system 1, and manages information such as print server information and location information. The print server information identifies respective groups of the print servers 12. For instance, in the example of FIG. 1, the print server information indicates that the print server 12a with a print server name DS #1 and the print server 12b with a print server name DS #2 belong to a group GA, and that the print server 12c with a print server name DS #3 belongs to a group GB. The location information identifies which of the print servers 12 stores a job of a certain user.

The management server 10 further manages information such as shared DB information and shared folder information. The shared DB information identifies which of the shared DBs 14 is to be referred to by a certain print server 12. The shared folder information identifies which of the shared folders 16 is to be referred to by a certain print server 12. The management server 10 also functions as an authentication server to perform user authentication. The above-described functions of the management server 10 may be distributed to and implemented by a plurality of servers.

Each of the shared DBs 14 is provided to each group including at least one print server 12. The shared DB 14 stores job information and a group identification (ID). The job information is information of a job stored in the at least one print server 12 in the same group as that of the shared DB 14. The group ID is an example of group identifying information of a group. The job information of the job stored in the at least one print server 12 includes job owner, job name, registration date, and print parameters (e.g., color printing, duplex printing, the number of pages, and the number of copies), which are meta-information other than the job data used in actual printing.

Each of the shared folders 16 stores the job data of the job stored in the at least one print server 12 in the same group as that of the shared folder 16. The shared folder 16 is implemented by a file server, for example, and is accessible by the at least one print server 12 in the same group as that of the shared folder 16.

The user terminal 18 is, for example, a personal computer (PC) operated by a user. The user terminal 18 is installed with a document preparation application as an example of an application, and receives from the user an instruction to prepare a document to be printed with the document preparation application and a print instruction. The MFP 20 is an example of a printing apparatus that acquires a job stored in a print server 12 and performs printing of the job. The MFP 20 is installed with a printer application as an example of an application for executing a process of acquiring and displaying a job list from a print server 12 and a process of acquiring the job data of a job selected from the job list by the user and printing the job data.

For example, in the print system 1 in FIG. 1, the shared DB 14a and the shared folder 16a in the group GA store the job information and the job data, respectively, of jobs stored in the print servers 12a and 12b in the group GA.

Further, in the print system 1 in FIG. 1, the shared DB 14b and the shared folder 16b in the group GB store the job information and the job data, respectively, of jobs stored in the print server 12c in the group GB.

The print servers 12a and 12b in the group GA are capable of acquiring the job information and the job data from the shared DB 14a and the shared folder 16a, respectively, which belong to the group GA. In the print system 1 in FIG. 1, therefore, the print server 12a is capable of acquiring the job information and the job data of a job stored in the print server 12b from the shared DB 14a and the shared folder 16a, respectively, which belong to the group GA.

With the above-described system, even if the print server 12a in the group GA is stopped in the print system 1 in FIG. 1, for example, it is possible for the print server 12b in the same group GA to acquire the job information and the job data stored in the stopped print server 12a and provide the acquired job information and job data to the MFP 20.

The print server 12a in the group GA, however, is unable to acquire the job information and the job data from the shared DB 14 and the shared folder 16 in a different group, such as the shared DB 14b and the shared folder 16b in the group GB, for example. In the print system 1 in FIG. 1, therefore, the print server 12a acquires from the print server 12c the job information and the job data of the job stored in the print server 12c, as described later.

The configuration of the print system 1 illustrated in FIG. 1 is illustrative. For example, at least a part of the functions of the shared DB 14 and the shared folder 16 in a group may be included in the at least one print server 12 in the same group as that of the shared DB 14 and the shared folder 16, or may be included in the management server 10. Further, the shared DB 14 and the shared folder 16 may have a redundant configuration, for example.

A hardware configuration of the print system 1 according to the embodiment will be described.

A hardware configuration of a computer forming the print system 1 according to the embodiment will first be described.

Figure 2:
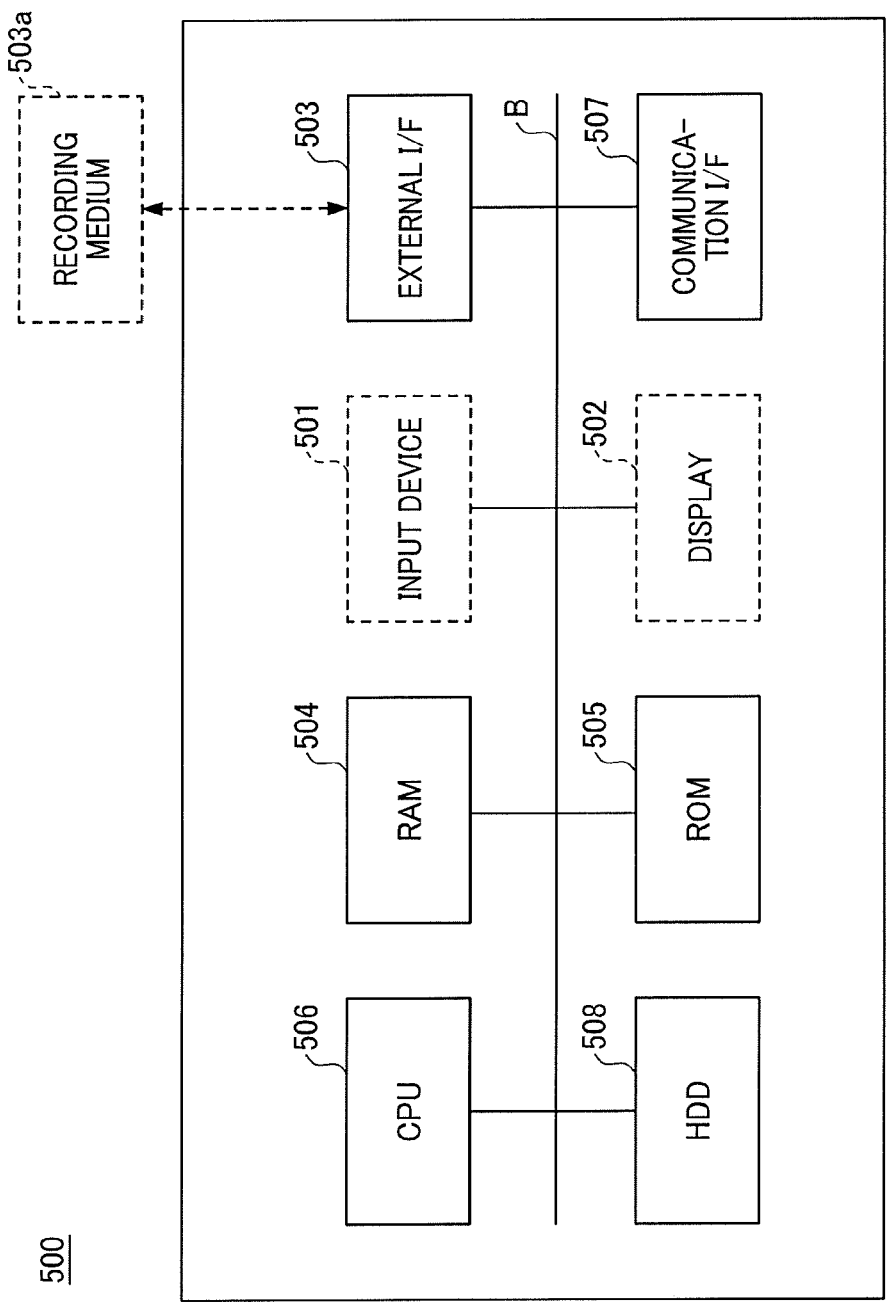
FIG. 2 is a diagram illustrating an exemplary hardware configuration of a computer forming the print system according to the embodiment.

The management server 10, the print servers 12, the shared DBs 14, the shared folders 16, and the user terminal 18 in FIG. 1 are implemented by at least one information processing apparatus, such as a computer having the hardware configuration illustrated in FIG. 2, for example.

FIG. 2 is a diagram illustrating an exemplary hardware configuration of a computer. A computer 500 in FIG. 2 includes, for example, an input device 501, a display 502, an external interface (I/F) 503, a random access memory (RAM) 504, a read-only memory (ROM) 505, a central processing unit (CPU) 506, a communication IN 507, and a hard disk drive (HDD) 508, which are connected to each other by a bus B. The input device 501 and the display 502 may be used as connected to the computer 500 when necessary.

The input device 501, which includes a keyboard, a mouse, and a touch panel, for example, is used by the user to input operation signals. The display 502 displays results of processing of the computer 500.

The communication I/F 507 is an interface that connects the computer 500 to a variety of networks. The computer 500 is therefore capable of performing data communication via the communication I/F 507.

The HDD 508 is an example of a non-volatile storage device that stores programs and data. The programs and data stored in the HDD 508 include an operating system (OS), which is fundamental software controlling the entire computer 500, and application software (hereinafter simply referred to as applications) for providing a variety of functions on the OS. In place of the HDD 508, the computer 500 may use a drive device using a flash memory (e.g., a solid state drive: SSD) as a storage medium.

The external I/F 503 is an interface to an external device such as a recording medium 503a, for example. The computer 500 is therefore capable of performing data reading and/or data writing on the recording medium 503a via the external I/F 503. The recording medium 503a includes a flexible disk, a compact disc (CD), a digital versatile disc (DVD), a secure digital (SD) memory card, and a universal serial bus (USB) memory, for example.

The ROM 505 is an example of a non-volatile semiconductor memory (i.e., storage device) capable of holding a program or data even after the computer 500 is powered off. The ROM 505 stores programs and data for use in settings of a basic input/output system (BIOS) and the OS and network settings executed at startup of the computer 500. The RAM 504 is an example of a volatile semiconductor memory (i.e., storage device) that temporarily holds a program or data.

The CPU 506 is an arithmetic device that loads programs and data onto the RAM 504 from storage devices such as the ROM 505 and the HDD 508 and executes processing with the programs and data, thereby performing overcall control of the computer 500 and implementing functions of the computer 500. With the hardware configuration of the computer 500 illustrated in FIG. 2, for example, the management server 10, the print servers 12, the shared DBs 14, the shared folders 16, and the user terminal 18 are capable of executing a variety of processes described later.

A hardware configuration of the MFP 20 will be described.

Figure 3:
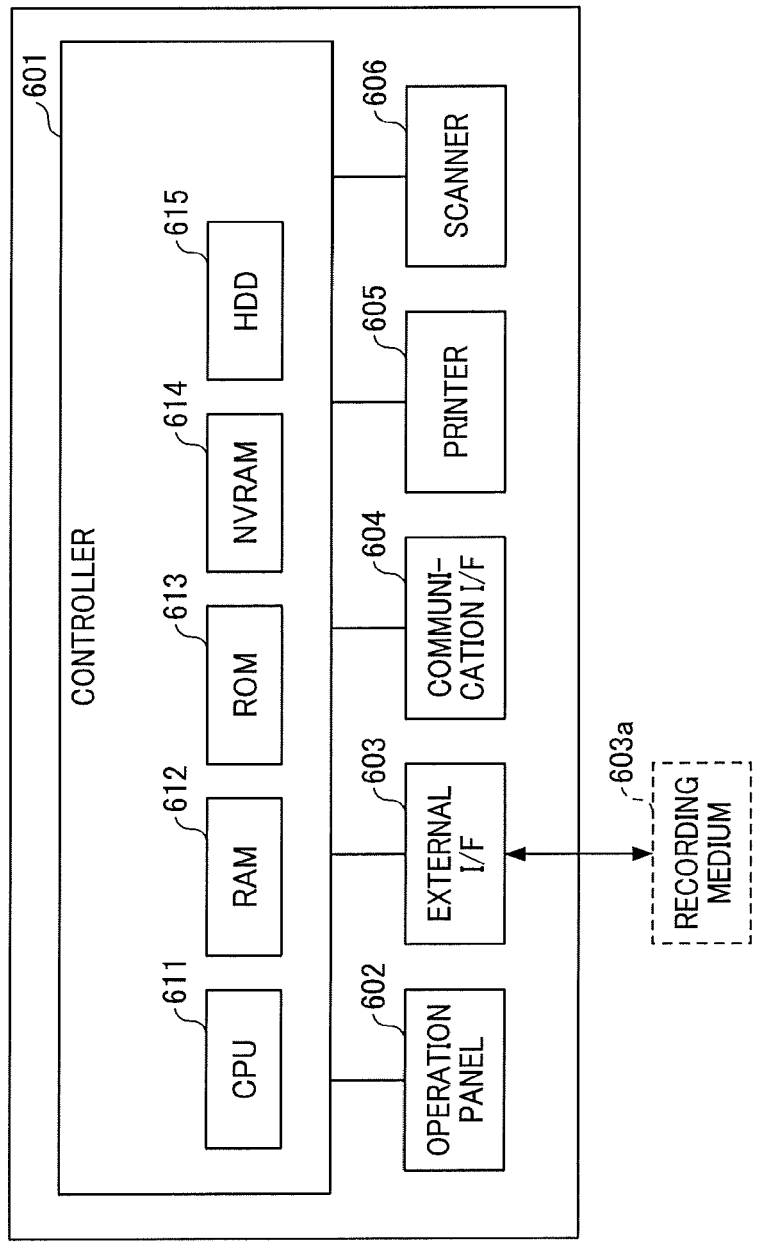
FIG. 3 is a diagram illustrating an exemplary hardware configuration of a multifunction peripheral forming the print system according to the embodiment.

The MFP 20 in FIG. 1 is implemented by a computer having the hardware configuration illustrated in FIG. 3, for example. FIG. 3 is a diagram illustrating an exemplary hardware configuration of the MFP 20. The MFP 20 illustrated in FIG. 3 includes a controller 601, an operation panel 602, an external I/F 603, a communication I/F 604, a printer 605, and a scanner 606, for example.

The controller 601 includes a CPU 611, a RAM 612, a ROM 613, a non-volatile RAM (NVRAM) 614, and an HDD 615, for example. The ROM 613 stores a variety of programs and data. The RAM 612 temporarily stores programs and data. The NVRAM 614 stores setting information, for example. The HDD 615 stores a variety of programs and data.

The CPU 611 loads programs, data, and setting information, for example, onto the RAM 612 from the ROM 613, the NVRAM 614, and the HDD 615, for example, and executes processing with the programs, data, and setting information, thereby performing overcall control of the MFP 20 and implementing functions of the MFP 20.

The operation panel 602 includes an input device that receives input from the user and a display that displays information. The external I/F 603 is an interface to an external device such as a recording medium 603a. The MFP 20 is therefore capable of performing data reading and/or data writing on the recording medium 603a via the external I/F 603. The recording medium 603a includes an integrated circuit (IC) card, a flexible disk, a CD, a DVD, an SD memory card, and a USB memory, for example.

The communication I/F 604 is an interface for connecting the MFP 20 to the network 22. The MFP 20 is therefore capable of performing data communication via the communication I/F 604. The printer 605 is a printing device for printing print data on a transported material. The transported material includes but is not limited to paper. As well as paper, which includes coated paper and thick paper, the transported material includes an overhead projector (OHP) sheet, a plastic film, a prepreg sheet, and copper foil, for example. The scanner 606 is a reading device for reading electronic image data from a document.

A software configuration of the print system 1 according to the embodiment will be described.

A software configuration of the management server 10 will first be described.

Figure 4:
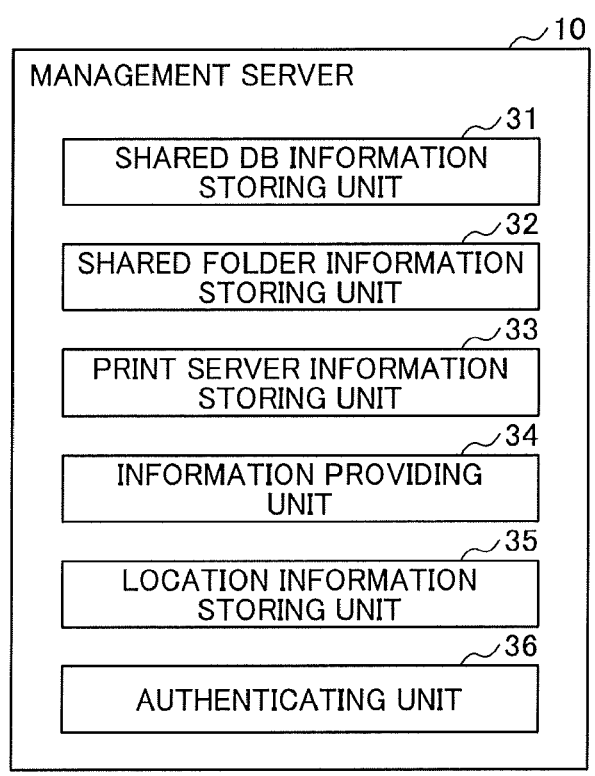
FIG. 4 is a diagram illustrating an exemplary functional configuration of a management server forming the print system according to the embodiment.

FIG. 4 is a diagram illustrating an exemplary functional configuration of the management server 10. In the functional configuration illustrated in FIG. 4, components unnecessary for the description of the embodiment are omitted as appropriate. The management server 10 in FIG. 4 includes a shared DB information storing unit 31, a shared folder information storing unit 32, a print server information storing unit 33 (i.e., a print server information storage area), an information providing unit 34, a location information storing unit 35, and an authenticating unit 36.

The shared DB information storing unit 31 stores and manages the shared DB information. The shared folder information storing unit 32 stores and manages the shared folder information. The print server information storing unit 33 stores and manages the print server information. The location information storing unit 35 stores and manages the location information. The information providing unit 34 provides the shared DB information, the shared folder information, the print server information, or the location information to a print server 12 based on a request therefrom. The authenticating unit 36 performs user authentication.

A software configuration of the print servers 12 will be described.

Figure 5:
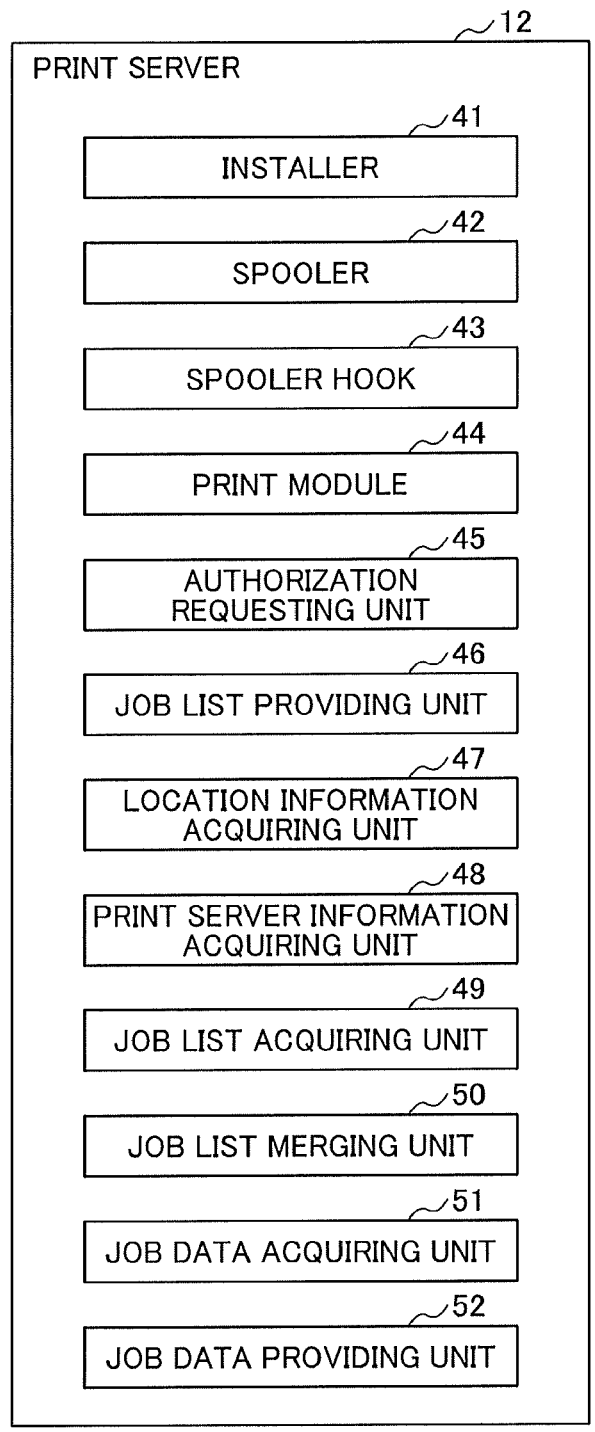
FIG. 5 is a diagram illustrating an exemplary functional configuration of a print server forming the print system according to the embodiment.

FIG. 5 is a diagram illustrating an exemplary functional configuration of each of the print servers 12. In the functional configuration illustrated in FIG. 5, components unnecessary for the description of the embodiment are omitted as appropriate. The print server 12 in FIG. 5 includes an installer 41, a spooler 42, a spooler hook 43, a print module 44, an authentication requesting unit 45, a job list providing unit 46, a location information acquiring unit 47, a print server information acquiring unit 48, a job list acquiring unit 49, a job list merging unit 50, a job data acquiring unit 51, and a job data providing unit 52.

The installer 41 performs operations such as various environmental settings of the print system 1 according to the embodiment and copying of files to be used. The spooler 42 temporarily stores a job transmitted thereto as a print request from the user terminal 18. The spooler hook 43 detects storage of the job in the spooler 42.

The print module 44 acquires, from the management server 10, information to be used in storing the job, and stores the job information and the job data of the job stored in the spooler 42 into the shared DB 14 and the shared folder 16, respectively. If the job stored in the spooler 42 is the first job from the owner of the job, the print module 44 transmits the later-described location information to the management server 10 to store the location information therein.

The authentication requesting unit 45 transmits a request for user authentication to the management server 10, and obtains a result of authentication. The job list providing unit 46 transmits a job list to the MFP 20. The location information acquiring unit 47 acquires the location information from the management server 10. The print server information acquiring unit 48 acquires the print server information from the management server 10.

The job list acquiring unit 49 acquires the job information (i.e., job lists) from the shared DB 14 in the same group as the group of the print server 12 including the job list acquiring unit 49 and from at least one print server 12 in a group different from the group of the print server 12 including the job list acquiring unit 49, as described later. The job list merging unit 50 merges the acquired job lists. The job data acquiring unit 51 acquires the job data from the shared folder 16 in the same group as the group of the print server 12 including the job data acquiring unit 51 and from at least one print server 12 in a group different from the group of the print server 12 including the job data acquiring unit 51, as described later. The job data providing unit 52 provides the acquired job data to the MFP 20, which requests the job data.

A software configuration of the shared DBs 14 will be described.

Figure 6:
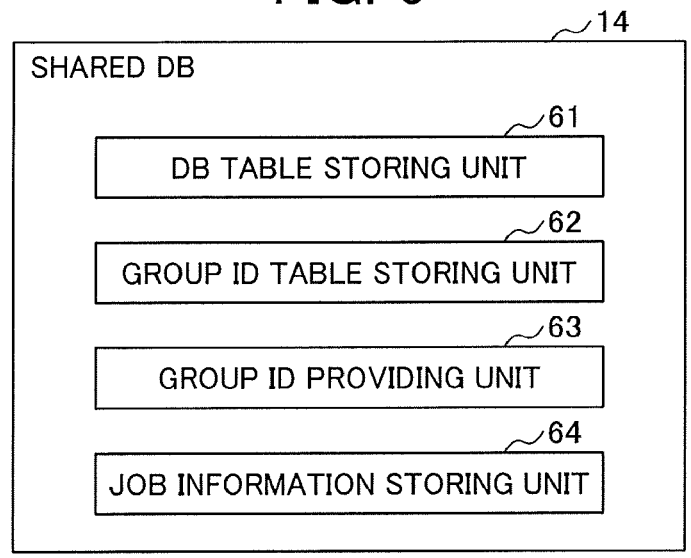
FIG. 6 is a diagram illustrating an exemplary functional configuration of a shared database forming the print system according to the embodiment.

FIG. 6 is a diagram illustrating an exemplary functional configuration of each of the shared DBs 14. In the functional configuration illustrated in FIG. 6, components unnecessary for the description of the embodiment are omitted as appropriate. The shared DB 14 in FIG. 6 includes a DB table storing unit 61, a group ID table storing unit 62, a group ID providing unit 63, and a job information storing unit 64.

The DB table storing unit 61 stores a DB table and an index enabling the shared DB 14 to function as a shared DB. The group ID table storing unit 62 stores the group ID of the group to which the shared DB 14 belongs to. The group ID providing unit 63 receives a request for the group ID from a print server 12, reads the group ID from the group ID table storing unit 62, and provides the read group ID to the print server 12, which requests the group ID. The job information storing unit 64 stores the job information of the job stored in at least one print server 12 in the same group as that of the shared DB 14.

A software configuration of the user terminal 18 will be described.

Figure 7:
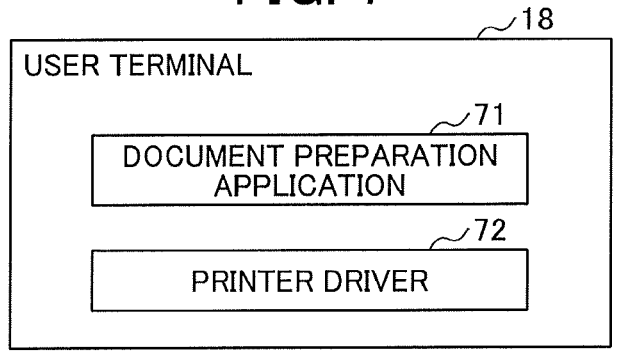
FIG. 7 is a diagram illustrating an exemplary functional configuration of a user terminal forming the print system according to the embodiment.

FIG. 7 is a diagram illustrating an exemplary functional configuration of the user terminal 18. In the functional configuration illustrated in FIG. 7, components unnecessary for the description of the embodiment are omitted as appropriate. The user terminal 18 in FIG. 7 includes a document preparation application 71 and a printer driver 72.

The document preparation application 71 provides the user with a function of preparing a document to be printed. The document preparation application 71 further receives a document print operation performed by the user. The printer driver 72 generates a job of the document, for which the document preparation application 71 has received the document print operation by the user. Then, the printer driver 72 transmits the job to the spooler 42 of a designated print server 12.

A software configuration of the MFP 20 will be described.

Figure 8:
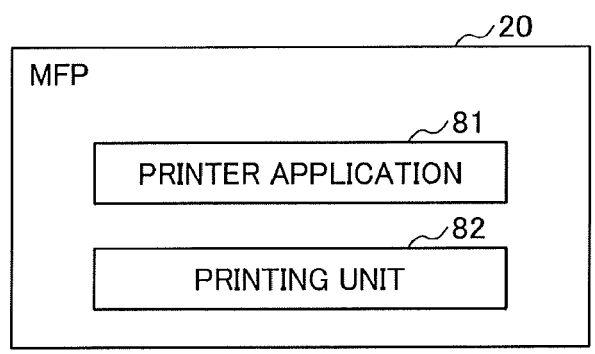
FIG. 8 is a diagram illustrating an exemplary functional configuration of the multifunction peripheral forming the print system according to the embodiment.

FIG. 8 is a diagram illustrating an exemplary functional configuration of the MFP 20. In the functional configuration illustrated in FIG. 8, components unnecessary for the description of the embodiment are omitted as appropriate. The MFP 20 in FIG. 8 includes a printer application 81 and a printing unit 82. The printer application 81 performs processes such as a process of acquiring and displaying a job list from a print server 12 and a process of acquiring the job data of the job selected from the job list by the user. The printing unit 82 executes printing of the acquired job data.

Processing of the print system 1 according to the embodiment will be described.

Figure 9:
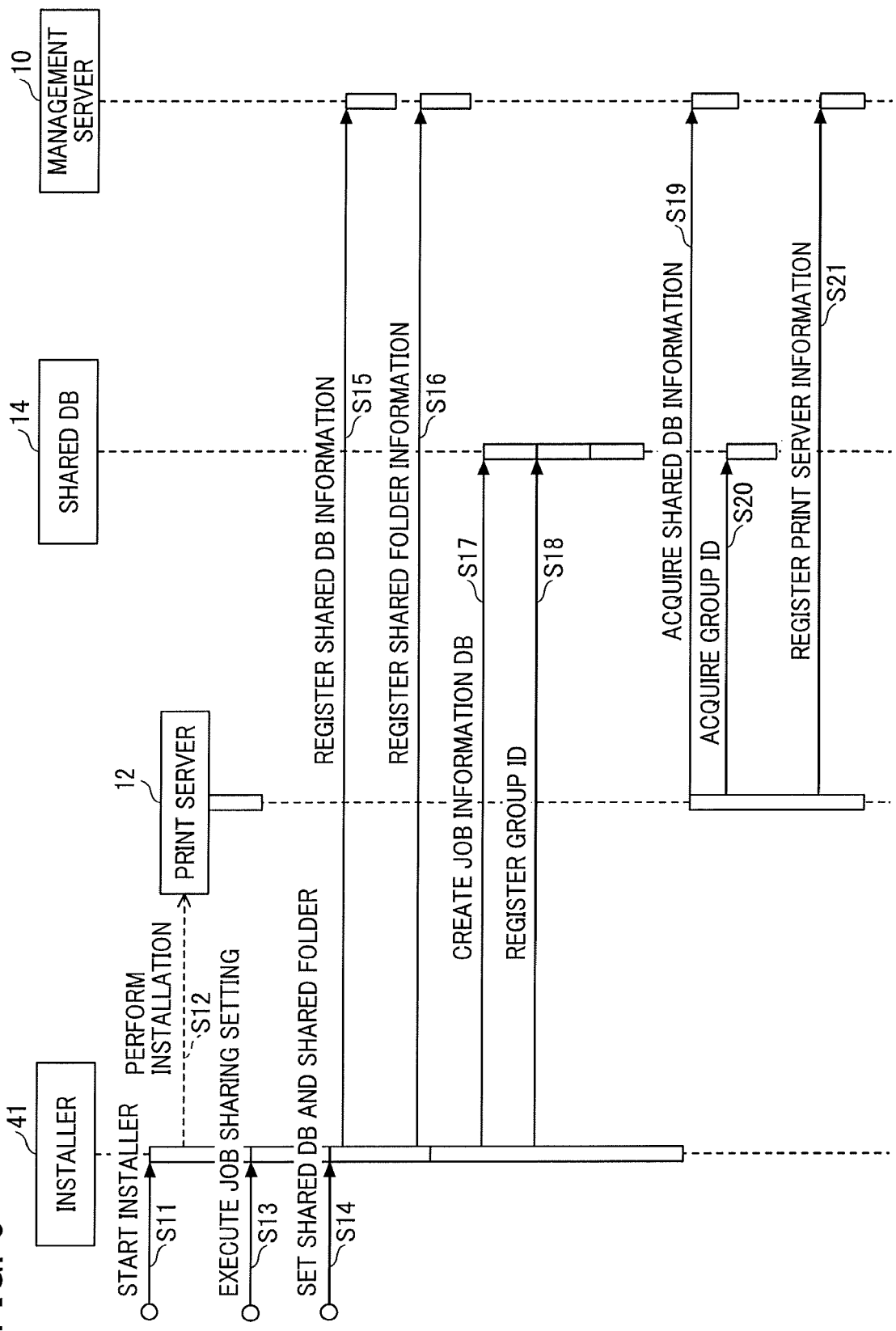
FIG. 9 is a sequence diagram illustrating an exemplary operation performed when the print server is installed.

FIG. 9 is a sequence diagram illustrating an exemplary operation performed when a print server 12 is installed. The sequence diagram of FIG. 9 illustrates a process of specifying a group during the installation of the print server 12. As well as the process illustrated in the sequence diagram of FIG. 9, the installation of files and data is also executed during the installation of the print server 12. Further, the sequence diagram of FIG. 9 illustrates an example in which the process is performed while settings are input on wizard screens for the installation process. However, the process may be performed in a batch, if such batch processing is capable of performing necessary settings.

At step S11, a system administrator, for example, starts the installer 41 to proceed with installation with group use setting turned on. At step S12, the installer 41 performs installation operations such as various environmental settings and copying of files to be used.

Figure 10A:
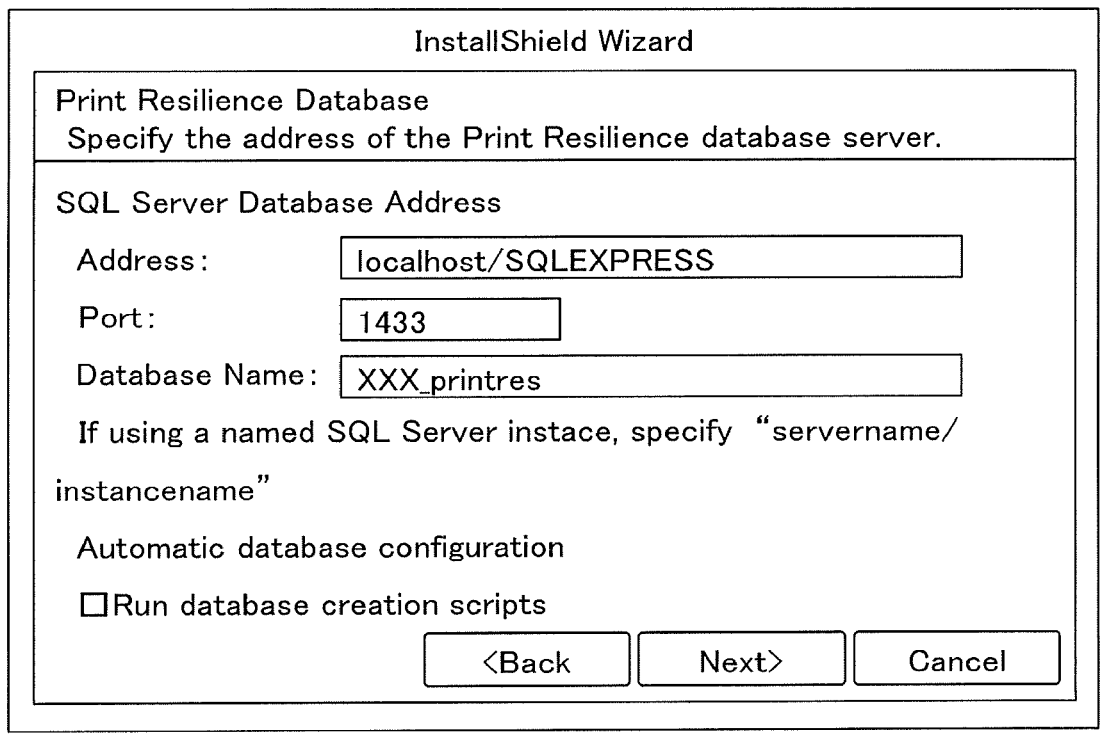
FIGS. 10A and 10B are diagrams illustrating images of exemplary setting screens displayed during the installation.
Figure 10B:
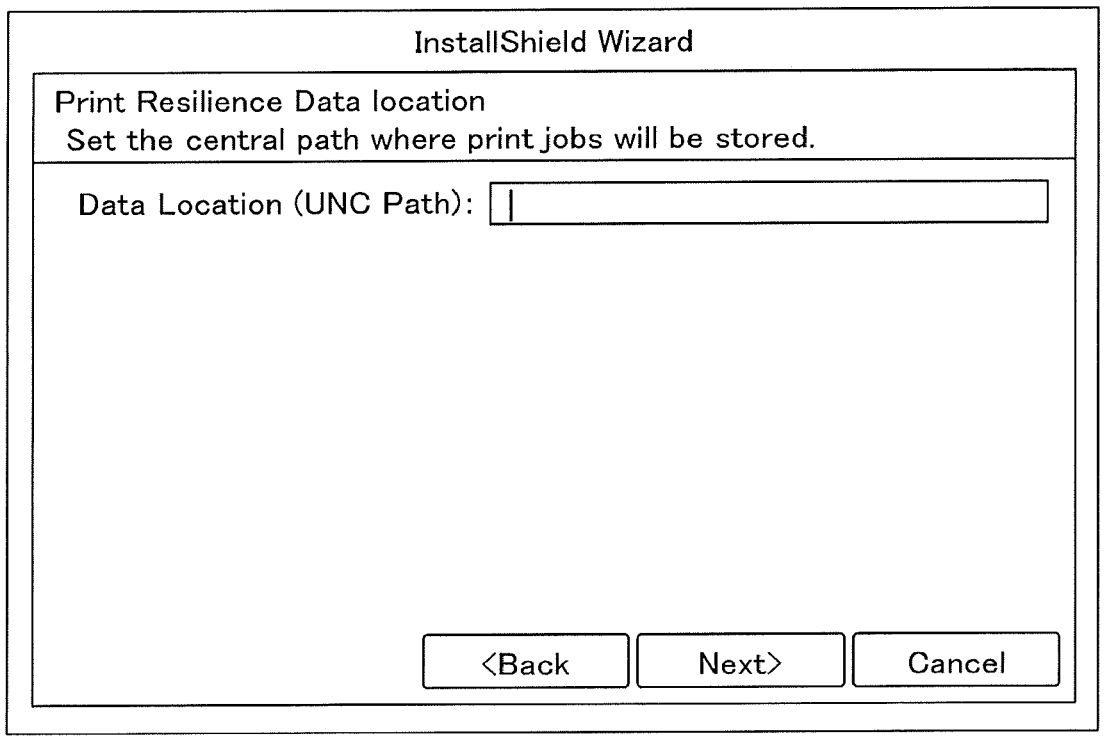

At step S13, the system administrator performs an operation of starting job sharing settings, and the installer 41 displays, on the display 502, setting screens such as those illustrated in FIGS. 10A and 10B. FIGS. 10A and 10B are diagrams illustrating images of exemplary setting screens displayed in the installation process. FIG. 10A is a diagram illustrating the image of an exemplary shared DB setting screen. The shared DB setting screen in FIG. 10A is a screen image for the setting of the DB information (e.g., information of an access path and authorization) to be used in the storage of the job information. FIG. 10B is a diagram illustrating the image of an exemplary shared folder setting screen. The shared folder setting screen in FIG. 10B is a screen image for the setting of a shared folder of the shared folder information (e.g., path) to be used in the storage of the job data.

At step S14, the system administrator sets the shared DB and the shared folder on the shared DB screen in FIG. 10A and the shared folder setting screen in FIG. 10B, respectively. At step S15, the installer 41 registers in the management server 10 the shared DB information set on the shared DB screen in FIG. 10A Further, at step S16, the installer 41 registers in the management server 10 the shared folder information set on the shared folder setting screen in FIG. 10B.

At step S17, based on the shared DB information, the installer 41 accesses the shared DB 14 and executes a previously obtained DB preparation script to generate the DB table and index to be used, thereby creating a job information DB. After the generation of the DB table, the installer 41 proceeds to step S18 to register a new group ID in a created group ID table. The group ID of one group should not be the same as the group ID of another group, and thus is set as a unique ID based on universally unique identifier (UUID). The group ID may be managed by the management server 10, for example, to be prevented from being duplicated.

At step S19, the print server 12 acquires the shared DB information from the management server 10 at startup of the print server 12. At step S20, the print server 12 acquires from the shared DB 14 the group ID of the group of the print server 12. At step S21, based on the shared DB information acquired at step S19, the print server 12 transmits to the management server 10 a request for registration of the print server information that associates the group ID acquired at step S20 with server information (e.g., print server name) of the print server 12. In response to the request for registration, the management server 10 registers the print server information.

For example, the print server information may be stored in the shared information storing unit 33 in a form of table as illustrated below. In TABLE 1 below, a print server ID of each print server belonging to a specific group is associated with a group ID of that specific group.

TABLE 1

| PRINT SERVER ID | GROUP ID |
|---|---|
| DS#1, DS#2 | AAAA |
| DS#3 | BBBB |

Figure 11:
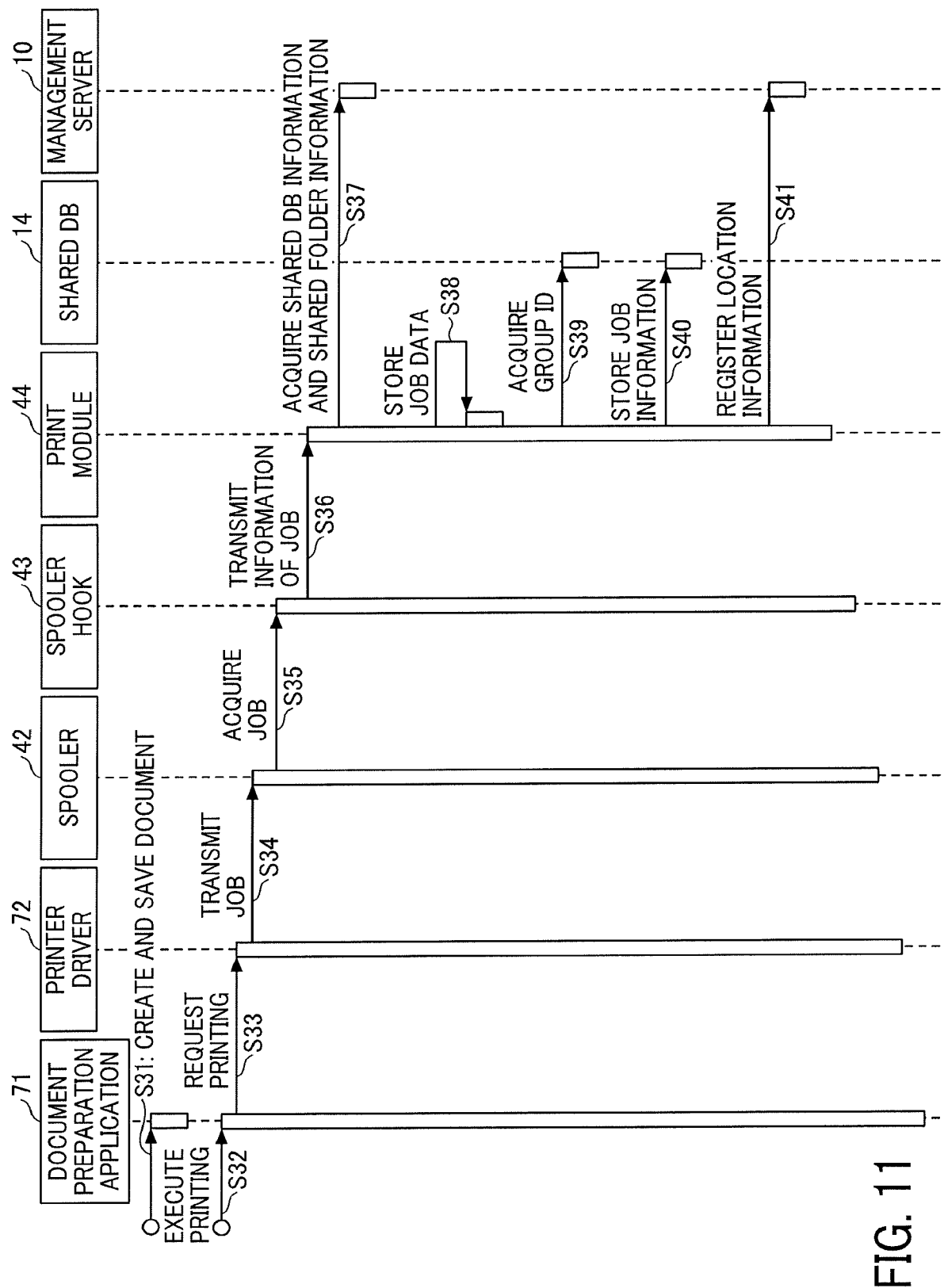
FIG. 11 is a sequence diagram illustrating an exemplary operation performed in a job storing process.

FIG. 11 is a sequence diagram illustrating an exemplary operation performed in a job storing process when a pull print job is stored into a print server 12 from the user terminal 18.

At step S31, the user operates the document preparation application 71 to create and save a document to be printed. At step S32, the user further operates the document preparation application 71 to select a print menu, specifies the printer driver 72 for the print server 12 from the print menu, and executes printing. At step S33, the document preparation application 71 transmits a print request to the printer driver 72 specified at step S32.

At step S34, in response to the print request, the printer driver 72 generates a job of the document, and transmits the job to the spooler 42 of the print server 12. At step S35, the spooler hook 43 detects that the job has been input to the spooler 42, and acquires the job. At step S36, the spooler hook 43 analyzes the content of the acquired job, and transmits the information of the job (e.g., the file path of the job data and job attribute values) to the print module 44.

At step S37, the print module 44 acquires the shared DB information and the shared folder information from the management server 10 as information to be used in the storage of the job. At step S38, the print module 44 stores the job data of the job stored in the spooler 42 into the shared folder 16.

At step S39, the print module 44 acquires from the shared DB 14 the group ID of the group of the print server 12 including the print module 44. Once a group ID is set, the group ID will not be changed during the operation of the print module 44. Therefore, the print module 44 may acquire and store the group ID at startup of the print module 44.

At step S40, the print module 44 stores the job information (e.g., the storage path of the job data, the job owner, and the print parameters) of the job stored in the spooler 42 into the shared DB 14.

If the job stored in the spooler 42 is the first job from the owner of the job, the print module 44 proceeds to step S41 to transmit the location information illustrated in FIG. 12 to the management server 10 to store the location information therein.

FIG. 12 is a diagram illustrating an exemplary configuration of the location information stored in the management server 10. The location information illustrated in FIG. 12 includes items such as the print server name of the print server 12 storing the job, the address of the print server 12, the group ID of the group of the print server 12, and the owner ID of the owner of the job. Based on the location information in FIG. 12, the print server 12 storing the job is registered as associated with the corresponding group ID and the corresponding user.

FIG. 13 is a sequence diagram illustrating an exemplary operation performed in a job printing process when a stored job is acquired and printed by the MFP 20. The MFP 20 is previously set with a print server 12 to which the MFP 20 is to be connected. The MFP 20 may previously be set with a plurality of print servers 12 to which the MFP 20 is to be connected so that when one of the print servers 12 is stopped, the MFP 20 fails over to another one of the print servers 12.

At step S51, the printer application 81 of the MFP 20 receives a login operation performed by the user. The login operation may be performed through key-input of a user ID and a password or through card authentication or biometric authentication with a fingerprint, for example.

At steps S52 and S53, the printer application 81 transmits input authentication information to the management server 10 via a print server 12 in the same group as that of the MFP 20 including the printer application 81 (i.e., the print server 12a in the example of FIG. 13), and receives a result of authentication.

If the authentication succeeds, the printer application 81 proceeds to step S54 to transmit a request for the job list to the print server 12a, to which the MFP 20 is connected, by specifying the user ID. At step S55, the print server 12a transmits a request for the location information to the management server 10 based on the specified user ID, and acquires the location information.

At step S56, the print server 12a selects from the acquired location information a print server 12 with a group ID different from the group ID of the print server 12a, excluding any print server 12 having the same group ID as that of the print server 12a. The print server 12a excludes the print server 12 having the same group ID, because the print server 12a is capable of acquiring a job in the same group as that of the print server 12a without the print server 12 having the same group ID. The print server 12a acquires from the management server 10 the print server information of a print server 12 in the group corresponding to a group ID acquired from the location information and different from the group ID of the print server 12a.

At step S57, the print server 12a transmits a request for the job list to each print server 12 in the group corresponding to the different group ID, and acquires the job list. In the example of FIG. 13, the print server 12a transmits the request for the job list to the print server 12c, and acquires the job list from the print server 12c. The processes of steps S56 and S57 are performed for each group ID in the location information different from the group ID of the print server 12a.

At step S58, the print server 12a merges the obtained job lists. If the group of the print server 12a includes a plurality of print servers 12 other than the print server 12a, only the job list of the print server 12 having transmitted the job list first among the plurality of print servers 12 is merged. This is because the same job list is obtainable from the plurality of print servers 12 in the same group.

The print server 12a transmits a job list resulting from the merging to the printer application 81, which has requested the job list. At step S59, the user selects a desired print job from the job list displayed on the operation panel 602 of the MFP 20, for example, and presses a print button, for example, to request printing of the print job. It is assumed in this example that a job stored in the print server 12a is selected.

At step S60, the printer application 81 transmits a request for the job data to the print server 12a storing the selected job. The print server 12a extracts the file path of the job data from the job information stored in the shared DB 14, acquires the job data from the shared folder 16, and transmits the acquired job data to the printer application 81. At step S62, the MFP 20 prints out the acquired job data onto the transported material (e.g., sheet).

As described above, according to one or more embodiments, the print system can execute printing of a print job stored in a print server, even if the print server is stopped. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:
1. A print system, comprising:
a plurality of print servers each configured to store a print job in response to an instruction from a user to store the print job;
a management server configured to manage the plurality of print servers;
a printer configured to, in response to a print instruction from the user, acquire the print job from one of the plurality of print servers and perform printing of the print job;
a print server information memory that stores print server information in which, for each print server of the plurality of print servers, print server identification information is stored in association with group identification information of a group to which the print server belongs;
a shared information memory that stores information of a set of print jobs to be shared by at least one of the plurality of print servers that belongs to a same group; and
a shared data memory that stores data of the set of print jobs to be shared by the at least one of the plurality of print servers in the same group,
each particular print server of the plurality of print servers including
circuitry configured to
receive a request for a print job list for the user from the printer,
acquire a list of print server group identifiers corresponding to the user,
acquire, using the acquired list of print server group identifiers and the print server information memory, print server identification information for those print servers having group identifiers other than a particular group identifier of the particular print server,
acquire, as a first print job list, information of the print job in the particular group of the particular print server, from the shared information memory, for each print server in the acquired print server identification information, transmit a request for a second print job list, and acquire, as the second print job list, information of the print job from the print server, merge the first print job list and each second print job list to generate the print job list, and provide the print job list to the printer.

2. The print system of claim 1, wherein, at startup of each particular print server of the plurality of print servers, the circuitry of the particular print server acquires, from the shared information memory, the group identification information of a group of the particular print server, and stores, in the print server information memory, the acquired group identification information in association with the print server identification information of the particular print server.

3. The print system of claim 2, wherein when the shared information memory is created, the circuitry of each of the plurality of print servers is configured to register, in the shared information memory, the group identification information of a group sharing the shared information memory.

4. The print system of claim 1, wherein the group identification information stored in the print server information is a universally unique identifier.

5. The print system of claim 1, wherein the printer is set with two or more of the plurality of print servers, and wherein when the printer fails to connect to one of the set two or more of the plurality of print servers, the printer automatically attempts to connect to another one of the set two or more of the plurality of print servers.

6. The print system of claim 1, further comprising a user terminal configured to receive an instruction from the user to store the print job.

7. The print system of claim 1, wherein the circuitry of each print server is configured to not send a request for the first print job list to other print servers in the particular group.

8. A print server connectable, via a network, to a management server that manages a plurality of print servers each configured to store a print job in response to an instruction from a user to store the print job, the print server comprising:

circuitry configured to acquire, from a print server information memory, print server information in which, for each print server of the plurality of print servers, print server identification information is stored in association with group identification information of a group to which the print server belongs, receive a request for a print job list for the user from a printer that, in response to a print instruction from the user, acquires the print job from one of the plurality of print servers and performs printing of the print job, acquire a list of print server group identifiers corresponding to the user, acquire, using the acquired list of print server group identifiers and the print server information memory, print server identification information for those print servers having group identifiers other than a particular group identifier of a particular print server, acquire, as a first print job list, information of the print job in the particular group of the print server from a shared information memory that stores information of a set of print jobs to be shared by at least one of the plurality of print servers that belongs to a same group, for each print server in the acquired print server identification information, transmit a request for a second print job list, and acquire, as the second print job list, information of the print job from the print server, merge the first print job list and each second print job list to generate the print job list, and provide the print job list to the printer.

9. A management server configured to manage a plurality of print servers each configured to store a print job in response to an instruction from a user to store the print job, the management server comprising:

a memory that stores print server information in which, for each print server of the plurality of print servers, print server identification information is stored in association with group identification information of a group to which the print server belongs; and circuitry configured to in response to a request from one of the plurality of print servers, the request including a user identifier of the user, provide the print server information, including group identifiers and corresponding print server identifiers corresponding to the user identifier, to the one of the plurality of print servers, and at startup of the one of the plurality of print servers, receive a request for registration of the print server information from the one of the plurality of print servers, and register the print server information in the memory.

10. A job list providing method performed by a print system connectable, via a network, to a plurality of print servers each configured to store a print job in response to an instruction from a user to store the print job, a management server to manage the plurality of print servers, and a printer configured to, in response to a print instruction from the user, acquire the print job from one of the plurality of print servers and perform printing of the print job, the job list providing method comprising:

acquiring, from a print server information memory, print server information in which, for each print server of the plurality of print servers, print server identification information is stored in association with group identification information of a group to which the print server belongs;

receiving a request for a print job list for the user from the printer to acquire the print job from a particular print server of the plurality of print servers, and perform printing of the print job in response to a print instruction from the user;

acquiring a list of print server group identifiers corresponding to the user;

acquiring, using the acquired list of print server group identifiers and the print server information memory, print server identification information for those print servers having group identifiers other than a particular group identifier of the particular print server, acquiring, as a first print job list, information of the print job in the particular group of the particular print server from a shared information memory that stores information of a set of print jobs to be shared by at least one of the plurality of print servers that belongs to a same group;

for each print server in the acquired print server identification information, transmitting a request for a second print job list, and acquiring, as the second print job list, information of the print job from the print server;

merging the first print job list and each second print job list to generate the print job list, and providing the print job list to the printer.

11. The job list providing method of claim 10, further comprising:

storing the print server information in the print server information memory;

in response to a request from one of the plurality of print servers, providing the print server information to the one of the plurality of print servers; and at startup of the one of the plurality of print servers, receiving a request for registration of the print server information from the one of the plurality of print servers, and registering the print server information in the print server information memory.

* * * * *